(12) United States Patent
Hilpert et al.

(10) Patent No.: US 8,139,775 B2
(45) Date of Patent: Mar. 20, 2012

(54) CONCEPT FOR COMBINING MULTIPLE PARAMETRICALLY CODED AUDIO SOURCES

(75) Inventors: Johannes Hilpert, Nuremberg (DE); Juergen Herre, Buckenhof (DE); Karsten Linzmeier, Erlangen (DE); Oliver Hellmuth, Erlangen (DE); Thorsten Kastner, Stockheim/Reitsch (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1309 days.

(21) Appl. No.: 11/739,544

(22) Filed: Apr. 24, 2007

(65) Prior Publication Data

US 2008/0008323 A1 Jan. 10, 2008

(51) Int. Cl.
*H04R 5/00* (2006.01)

(52) U.S. Cl. ............... 381/22; 381/23; 381/18; 381/119

(58) Field of Classification Search .......... 381/1, 17–19, 381/22, 23, 119; 700/94; 704/500, 501
See application file for complete search history.

(56) References Cited

U.S. PATENT DOCUMENTS

| 6,009,384 | A | 12/1999 | Veldhuis et al. | |
|---|---|---|---|---|
| 6,330,533 | B2 | 12/2001 | Su et al. | |
| 7,853,022 | B2 * | 12/2010 | Thompson et al. | 381/17 |
| 2005/0062843 | A1 | 3/2005 | Bowers | |
| 2005/0074127 | A1 | 4/2005 | Herre | |
| 2006/0115100 | A1 | 6/2006 | Faller | |
| 2007/0230710 | A1 * | 10/2007 | Van Loon et al. | 381/23 |
| 2007/0291951 | A1 * | 12/2007 | Faller | 381/22 |

FOREIGN PATENT DOCUMENTS

| CA | 2579114 | 3/2006 |
|---|---|---|
| WO | WO 2005/093717 A1 | 10/2005 |
| WO | WO2005/101371 | 10/2005 |
| WO | WO2005/112003 | 11/2005 |
| WO | 2006/008683 | 1/2006 |

OTHER PUBLICATIONS

Herre J., et al., "Spatial Audio Coding: Next-Generation Efficient and Compatible Coding of Multi-Channel Audio," Oct. 28, 2004, Audio Engineering Society Convention Paper, New York, NY, U.S.A.
Faller, Christof, "Parametric Joint-Coding of Audio Sources," May 20, 2006, 120$^{th}$ AES Convention, New York, NY, U.S.A.
English Translation of Russian OA received on Mar. 12, 2010 in the parallel Russian application No. 2009104047/09(005388).

(Continued)

*Primary Examiner* — Xu Mei
(74) *Attorney, Agent, or Firm* — Michael A. Glenn; Glenn Patent Group

(57) ABSTRACT

According to the present invention, multiple parametrically encoded audio signals can be efficiently combined using an audio signal generator, which generates an audio output signal by combining the down-mix channels and the associated parameters of the audio signals directly within the parameter domain, i.e. without reconstructing or decoding the individual input audio signals prior to the generation of the audio output signal. This is achieved by direct mixing of the associated down-mix channels of the individual input signals. It is one key feature of the present invention that the combination of the down-mix channels is achieved by simple, computationally inexpensive arithmetic operations.

20 Claims, 8 Drawing Sheets

OTHER PUBLICATIONS

English Translation of Notification for the Opinion of Examination in related Taiwanese patent application No. 96124286, notification mailed Jul. 13, 2010, 3 pages.

Office Action dated Sep. 23, 2010 in parallel Australian Patent Application No. 2007271532, 2 pages.

Baumgarte, F. et al. "Estimation of auditory spatial cues for binaural cue coding," ICASSP, Orlando, FL, May 2002.

Blauert, J. "Spatial Hearing: The Psychophysics of Human Sound Localization," The MIT Press, Cambridge, MA, revised edition 1997.

Breebaart, J. et al. "High-quality Parametric Spatial Audio Coding at Low Bitrates," AES 116$^{th}$ Convention, Berlin, Preprint 6072, May 2004.

Faller, C. "Parametric Joint Coding of Audio Sources," Convention Paper 6752, 120$^{th}$ AES Convention, Paris, May 2006.

Faller, C. et al. "Binaural cue coding applied to audio compression with flexible rendering," AES 113$^{th}$ Convention, Los Angeles, Preprint 5686, Oct. 2002.

Faller, C. et al. "Binaural cue coding—Part II: schemes and applications," IEEE Trans. On Speech and Audio Proc., vol. 11, No. 6, Nov 2003.

Faller, C. et al. "Binaural cue coding: a novel and efficient representation of spatial audio," ICASSP, Orlando, FL, May 2002.

Faller, C. et al. "Efficient representation of spatial audio using perceptual parametrization," IEEE WASPAA, Mohonk, NY, Oct. 2001.

Schuijers, E. et al. "Los Complexity Parametric Stereo Coding," AES 116$^{th}$ Convention, Berlin, Preprint 6073, May 2004.

* cited by examiner

CONCEPT FOR COMBINING MULTIPLE PARAMETRICALLY CODED AUDIO SOURCES

FIELD OF THE INVENTION

The present invention relates to multi-channel audio coding and, in particular, to a concept of combining parametrically coded audio-streams in a flexible and efficient way.

BACKGROUND OF THE INVENTION AND PRIOR ART

The recent development in the area of audio coding has brought forward several parametric audio coding techniques for jointly coding a multi-channel audio signal (e.g. 5.1 channels) signal into one (or more) down-mix channel plus a side information stream. Generally, the side information stream has parameters relating to properties of the original channels of the multi-channel signal either with respect to other original channels of the multi-channel signal or with respect to the down-mix channel. The particular definition of parameters of the reference channel, to which these parameters relate, depends on the specific implementation. Some of the techniques known in the art are "binaural cue coding", "spatial audio coding", and "parametric stereo".

For details of these particular implementations, reference is herewith made to related publications. Binaural cue coding is for example detailed in:

C. Faller and F. Baumgarte, "Efficient representation of spatial audio using perceptual parametrization," IEEE WASPAA, Mohonk, N.Y., October 2001; F. Baumgarte and C. Faller, "Estimation of auditory spatial cues for binaural cue coding," ICASSP, Orlando, Fla., May 2002; C. Faller and F. Baumgarte, "Binaural cue coding: a novel and efficient representation of spatial audio," ICASSP, Orlando, Fla., May 2002; C. Faller and F. Baumgarte, "Binaural cue coding applied to audio compression with flexible rendering," AES 113th Convention, Los Angeles, Preprint 5686, October 2002; C. Faller and F. Baumgarte, "Binaural Cue Coding—Part II: Schemes and applications," IEEE Trans. on Speech and Audio Proc., vol. 11, no. 6, November 2003.

While binaural cue coding uses multiple original channels, parametric stereo is a related technique for the parametric coding of a two-channel stereo signal resulting in a transmitted mono signal and parameter side information, as for example reviewed in the following publications: J. Breebaart, S. van de Par, A. Kohlrausch, E. Schuijers, "High-Quality Parametric Spatial Audio Coding at Low Bitrates", AES 116th Convention, Berlin, Preprint 6072, May 2004; E. Schuijers, J. Breebaart, H. Purnhagen, J. Engdegard, "Low Complexity Parametric Stereo Coding", AES 116th Convention, Berlin, Preprint 6073, May 2004.

Other technologies are based on multiplexing of arbitrary numbers of audio sources or objects into a single transmission audio channel. Schemes based on multiplexing are, for example, introduced as "flexible rendering" in BCC (binaural cue coding) related publications or, more recently, by a scheme called "joint source coding" (JSC). Related publications are, for example: C. Faller, "Parametric Joint Coding of Audio Sources", Convention Paper 6752, 120th AES Convention, Paris, May 2006. Similar to the parametric stepreo and binaural cue coding schemes, these techniques are intended to encode multiple original audio objects (channels) for transmission by fewer down-mix channels. By additionally deriving object-based parameters for each input channel, which can be encoded at a very low data rate and which are also transmitted to a receiver, these objects can be separated at the receiver side and rendered (mixed) to a certain number of output devices, as for example head phones, two-channel stereo loudspeakers, or multi-channel loudspeaker set-ups. This approach allows for level adjustment and redistribution (panning) of the different audio objects to different locations in the reproduction set-up, i.e. at the receiver side.

Basically, such techniques operate as M-k-N transmitter, with M being the number of audio objects at the input, k being the number of transmitted down-mix channels, typically $k \leq 2$. N is the number of audio channels at the renderer output, i.e. for example the number of loudspeakers. That is, N=2 for a stereo renderer or N=6 for a 5.1 multi-channel speaker set-up. In terms of compression efficiency, typical values are e.g. 64 kbps or less for a perceptually coded down-mix channel (consisting of k audio channels) and approximately 3 kbps for object parameters per transmitted audio object.

Application scenarios for the above techniques are for example encoding of spatial audio scenes related to cinema-movie-productions to allow for a spatial-reproduction of sound in a home-theatre system. Common examples are the widely known 5.1 and 7.1 surround-sound tracks on movie media, such as DVD and the like. Movie-productions are becoming more and more complex with respect to the audio-scenes, which are intended to provide a spatial listening experience and thus have to be mixed with great care. Different sound engineers may be commissioned with the mixing of different surround sources or sound-effects and therefore, transmission of parametrically encoded multi-channel scenarios between the individual sound engineers is desirable, to transport the audio-streams of the individual sound engineers efficiently.

Another application scenario for such a technology is teleconferencing with multiple talkers at either end of a point-to-point connection. To save bandwidth, most teleconferencing set-ups operate with monophonic transmission. Using, for example, joint source coding or one of the other multi-channel encoding techniques for transmission, redistribution and level-alignment of the different talkers at the receiving end (each end) can be achieved and thus the intelligibility and balance of the speakers is enhanced by spending a marginally increased bit rate as compared to a monophonic system. The advantage of increased intelligibility becomes particularly evident in the special case of assigning each individual participant of the conference to a single channel (and thus speaker) of a multi-channel speaker set-up at a receiving end. This, however, is a special case. In general, the number of participants will not match the number of speakers at the receiving end. However, using the existing speaker setup it is possible to render the signal associated with each participant such that it appears to be originating from any desired position. That is, the individual participant is not only recognized by his/her different voice but also by the location of the audio-source related to the talking participant.

While the state of the art techniques implement concepts as to how to efficiently encode multiple channels or audio objects, all of the presently known techniques lack the possibility to combine two or more of these transmitted audio-streams efficiently to derive an output stream (output signal), which is a representation of all of the input audio-streams (input audio signals).

The problem arises, for example, when a teleconferencing scenario with more than two locations is considered, each location having one or more speakers. Then, an intermediate instance is required to receive the audio input signals of the individual sources and to generate an audio output signal for each teleconferencing location having only the information of the remaining teleconferencing locations. That is, the intermediate instance has to generate an output signal, which is derived from a combination of two or more audio input signals and which allows for a reproduction of the individual audio channels or audio objects of the two or more input signals.

A similar scenario may occur when two audio-engineers in a cinema-movie production want to combine their spatial-audio signals to check for the listening impression generated by both signals. Then, it may be desirable to directly combine two encoded multi-channel signals to check for the combined listening impression. That is, a combined signal needs to be such that it resembles all of the audio objects (sources) of the two audio-engineers.

However, according to prior art techniques, such a combination is only feasible by decoding of the audio signals (streams). Then, the decoded audio signals may again be re-encoded by prior art multi-channel encoders to generate a combined signal in which all of the original audio channels or audio objects are represented appropriately.

This has the disadvantage of high computational complexity, thus wasting a lot of energy and making it sometimes even unfeasible to apply the concept, especially in real-time scenarios. Furthermore, a combination by subsequent audio decoding and re-encoding can cause a considerable delay due to the two processing steps which is unacceptable for certain applications, such as teleconferencing/telecommunications.

SUMMARY OF THE INVENTION

It is the object of the present invention to provide a concept to efficiently combine multiple parametrically coded audio signals.

In accordance with a first aspect of the present invention, this object is achieved by an audio signal generator for generating an audio output signal, the audio signal generator comprising: an audio signal receiver for receiving a first audio signal comprising a first down-mix channel having information on two or more first original channels, and comprising an original parameter associated with one of the first original channels describing a property of one of the first original channels with respect to a reference channel; and a second audio-signal comprising a second down-mix channel having information on at least one second original channel; a channel combiner for deriving a combined down-mix channel by combining the first down-mix channel and the second down-mix channel; a parameter calculator for deriving a first combined parameter describing the property of one of the first original channels with respect to a common reference channel, and a second combined parameter describing the property of another one of the first original channels or of the at least one second original channel with respect to the common reference channel; and an output interface for outputting the audio output signal comprising the combined down-mix channel, the first and second combined parameters.

In accordance with a second aspect of the present invention, this object is achieved by a method of generating an audio output signal, the method comprising: receiving a first audio signal comprising a first down-mix channel having information on two or more first original channels, and comprising an original parameter associated with one of the first original channels describing a property of one of the first original channels with respect to a reference channel and a second audio signal comprising a second down-mix channel having information on at least one second original channel; deriving a combined down-mix channel by combining the first down-mix channel and the second down-mix channel; deriving a first combined parameter describing the property of one of the first original channels with respect to a common reference channel and a second combined parameter describing the property of another one of the first original channels or of the at least one second original channel with respect to a common reference channel; and outputting the audio output signal comprising the combined down-mix channel and the first and second combined parameters.

In accordance with a third aspect of the present invention, this object is achieved by a representation of three or more audio channels, comprising: a combined down-mix channel being a combination of a first down-mix channel having information on at least two first original channels and a second down-mix channel having information on at least one second original channel; a first parameter describing a property of one of the at least two first original channels with respect to a reference channel; and a second parameter describing the property of another channel of the first original channels or the property of the at least one second original channel with respect to the reference channel.

In accordance with a fourth aspect of the present invention, this object is achieved by a computer program implementing a method for generating an audio output signal, the method comprising: receiving a first audio signal comprising a first down-mix channel having information on two or more first original channels, and comprising an original parameter associated with one of the first original channels describing a property of one of the first original channels with respect to a reference channel and a second audio signal comprising a second down-mix channel having information on at least one second original channel; deriving a combined down-mix channel by combining the first down-mix channel and the second down-mix channel; deriving a first combined parameter describing the property of one of the first original channels with respect to a common reference channel and a second combined parameter describing the property of another one of the first original channels or of the at least one second original channel with respect to a common reference channel; and outputting the audio output signal comprising the combined down-mix channel and the first and second combined parameters.

In accordance with a fifth aspect of the present invention, this object is achieved by a conferencing system having an audio signal generator for generating an audio output signal, comprising: an audio signal receiver for receiving a first audio signal comprising a first down-mix channel having information on two or more first original channels, and comprising an original parameter associated with one of the first original channels describing a property of one of the first original channels with respect to a reference channel; and a second audio signal comprising a second down-mix channel having information on at least one second original channel; a channel combiner for deriving a combined down-mix channel by combining the first down-mix channel and the second down-mix channel; a parameter calculator for deriving a first combined parameter describing the property of one of the first original channels with respect to a common reference channel, and a second combined parameter describing the property of another one of the first original channels or of the at least one second original channel with respect to the common reference channel; and an output interface for outputting the audio output signal comprising the combined down-mix channel, the first and second combined parameter.

The present invention is based on the finding that multiple parametrically encoded audio signals can be efficiently combined using an audio signal generator or audio signal combiner, which generates an audio output signal by combining the down-mix channels and the associated parameters of the audio input signals directly within the parameter domain, i.e. without reconstructing or decoding the individual audio input signals prior to the generation of the audio output signal. To be more specific, this is achieved by direct mixing of the associated down-mix channels of the individual input signals, for example by summation or formation of a linear combination of the same. It is a key feature of the present invention that the combination of the down-mix channels is achieved by simple, computationally inexpensive arithmetical operations, such as summation.

The same holds true for the combination of the parameters associating the down-mix channels. As generally at least a sub-set of the associated parameters will have to be altered during the combination of the input audio signals, it is most important that the calculations performed to alter the parameters are simple and hence do not need significant computational power nor that they incur additional delay, e.g. by using filterbanks or other operations involving memory.

According to one embodiment of the present invention, an audio signal generator for generating an audio output signal is implemented to combine a first and a second audio signal, both being parametrically encoded. For generating the audio output signal, the inventive audio signal generator extracts the down-mix channels of the input audio signals and generates a combined down-mix channel by forming a linear combination of the two down-mix channels. That is, the individual channels are added with additional weights applied.

In a preferred embodiment of the present invention, the applied weights are derived by extremely simple arithmetical operations, for example by using the number of channels represented by the first audio signal and the second audio signal as a basis for the calculation.

In a further preferred embodiment, the weight calculation is performed under the assumption that each original audio channel of the input signals contributes to the total signal energy with the same quantity. That is, the weights applied are simple ratios of the channel numbers of the input signals and the total number of channels.

In a further preferred embodiment of the present invention, the weights of the individual down-mix channels are calculated based on the energy contained within the down-mix channels such as to allow for a more authentic reproduction of the combined down-mix channel included in the output audio signal generated.

In a further preferred embodiment of the present invention, the computational effort is further decreased in that only the parameters associated to one of the two audio signals are altered. That is, the parameters of the other audio signal are transmitted unaltered, therefore not causing any computations and hence minimizing the load on the inventive audio signal generator.

In the following paragraphs, the inventive concept will be detailed mainly for a coding scheme using joint source coding (JSC). In that sense, the current invention extends this technology for connecting multiple monophonic or JSC-enabled transceivers to remote stations by mixing JSC down-mix signals and object information within the parameter domain. As the above considerations have shown, the inventive concept is by no means restricted to the use of JSC-coding but could also be implemented with BCC-coding, or other multi-channel coding schemes, such as MPEG spatial audio coding (MPEG Surround) and the like.

As the inventive concept will be detailed mainly by using JSC coding, JSC coding will be shortly reviewed within the following paragraphs in order to more clearly point out the flexibility of the inventive concept and the enhancements achievable over prior art when applying the inventive concept to existing multi-channel audio coding schemes.

For the explanation of JSC coding, reference will in the following be made to FIGS. 1 and 2. Within the following figures, functionally identical components share the same reference marks, indicating that individual components providing the same functionality may be interchanged between the single embodiments of the present invention without loosing or restricting functionality and without limiting the scope of the present invention.

Figure 1:
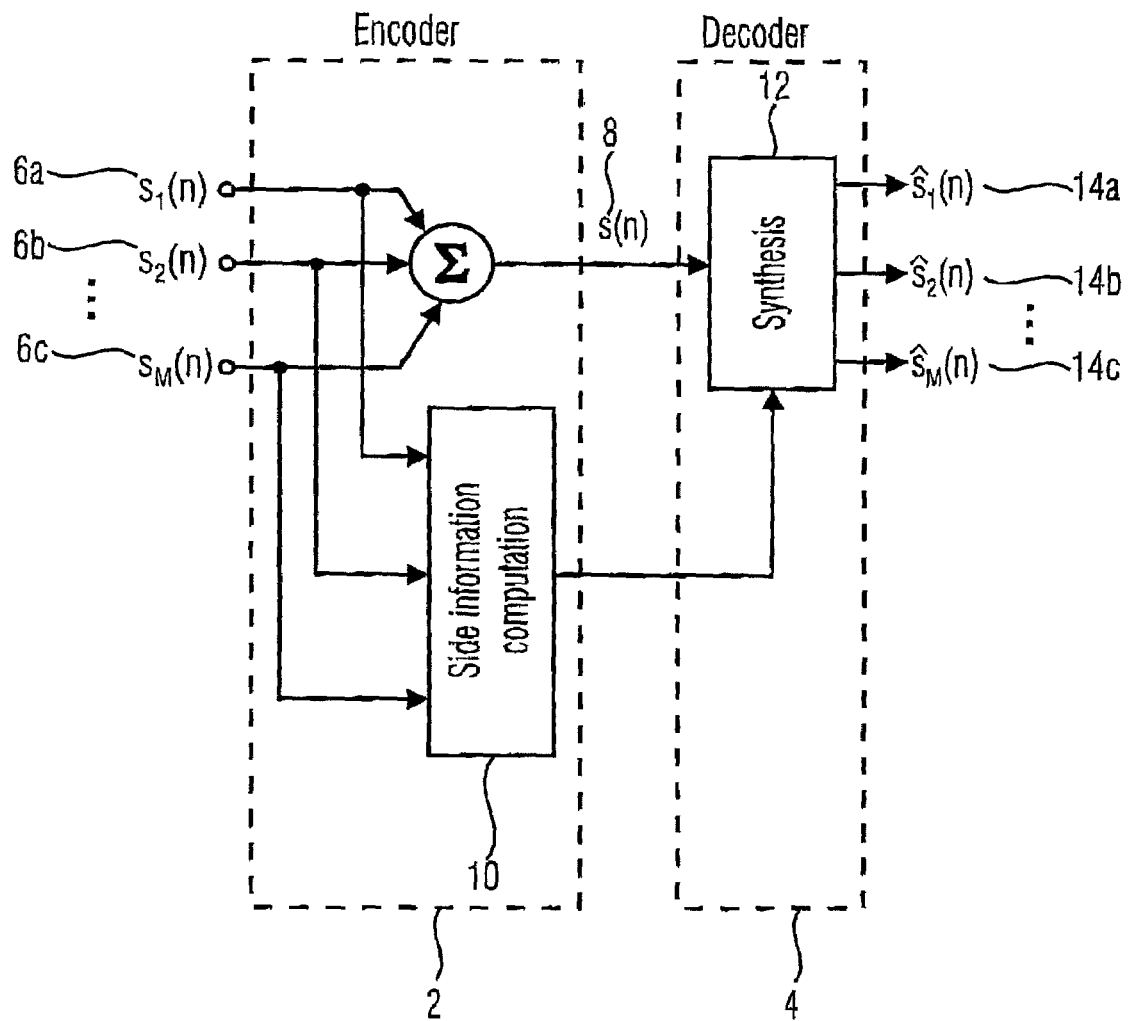
FIG. 1 shows an example of a JSC coding-scheme.

FIG. 1 shows a block diagram of the joint source coding scheme, a corresponding encoder 2 and a corresponding decoder 4.

The encoder 2 receives discrete audio inputs $s_i(n)$ 6a, 6b, and 6c and creates a down-mix signal s(n) 8, for example by a summation of the waveforms.

Additionally, a parameter extractor 10 within encoder 2 extracts parametric side information for each single object (signal 6a, 6b, and 6c). Although not shown in FIG. 1, the down-mix signal 8 may be further compressed by a speech or audio coder and is transmitted with the adjacent parametric side information to the JSC decoder 4. A synthesis module 12 within decoder 4 regenerates estimates 14a, 14b, and 14c ($\hat{s}_i(n)$) of the input objects (channels 6a, 6b, and 6c)

In order to reconstruct estimates 14a, 14b, and 14c, being perceptually similar to the discrete input objects (input channels) 6a, 6b, and 6c, appropriate parametric side information for each channel has to be extracted. As the individual channels are summed up for generation of down-mix signal 8, power ratios between channels are such suitable quantities. Therefore, the parametric information for the different objects or channels consists of power ratios $\Delta p$ of each object relative to the first object (reference object).

This information is derived in the frequency domain in non-equally spaced frequency bands (sub-bands) corresponding to the critical band resolution of human auditory perception. This is a concept described in more detail for example in: J. Blauert, "Spatial Hearing: The Psychophysics of Human Sound Localization", The MIT Press, Cambridge, Mass., revised edition 1997.

That is, the broad band input audio channels are filtered into several frequency bands of finite bandwidth and for each of the individual frequency bands, the following calculations are performed. As already mentioned, the bandwise power of the first object (reference object or reference channel) acts as a reference value.

$$\Delta p_i(n) = 10\log_{10}\frac{E\{\hat{s}_i^2(n)\}}{E\{\hat{s}_1^2(n)\}}, \ i = 2\ldots M \qquad \text{Equation 1}$$

To avoid further introduction of artefacts, for example introduced by a division by zero, these power ratios (in the logarithmic representation) can further be limited to a maximum of, for example, 24 dB in each subband. The power ratio may furthermore be quantized prior to submission to additionally save transmission bandwidth.

It is not necessary to explicitly transmit the power of the first object. Instead, this value can be derived from the assumption that for statistically independent objects, the sum of the powers of the synthesized signals s(n) is equal to the power of the down-mix signal s(n). In terms of a mathematical expression, this means:

$$E\{s^2(n)\} = \sum_{i=1}^{M} E\{\hat{s}_i^2(n)\} \qquad \text{Equation 2}$$

Based on this assumption and equation, the subband powers for the first object (the reference object or reference channel) can be reconstructed, as it will be described further below when detailing the inventive concept.

To summarize, an audio signal or audio-stream according to JSC comprises a down-mix channel and associated parameters, the parameters describing power ratios of original channels with respect to one original reference channel. It may be noted that this scenario may easily be altered in that other channels are selected to be the reference channel. For example, the down-mix channel itself may be the reference channel, requiring the transmission of one additional parameter, relating the power of the first, former reference channel, to the power of the down-mix channel. Also, the reference channel may be chosen to be varying in that the one channel having the most power is selected to be the reference channel. Hence, as the power within the individual channels may change with time, the reference channel may also vary with time. Also, due to the fact that all processing is typically carried out in a frequency selective fashion, the reference channel can be different for different frequency bands.

Figure 2:
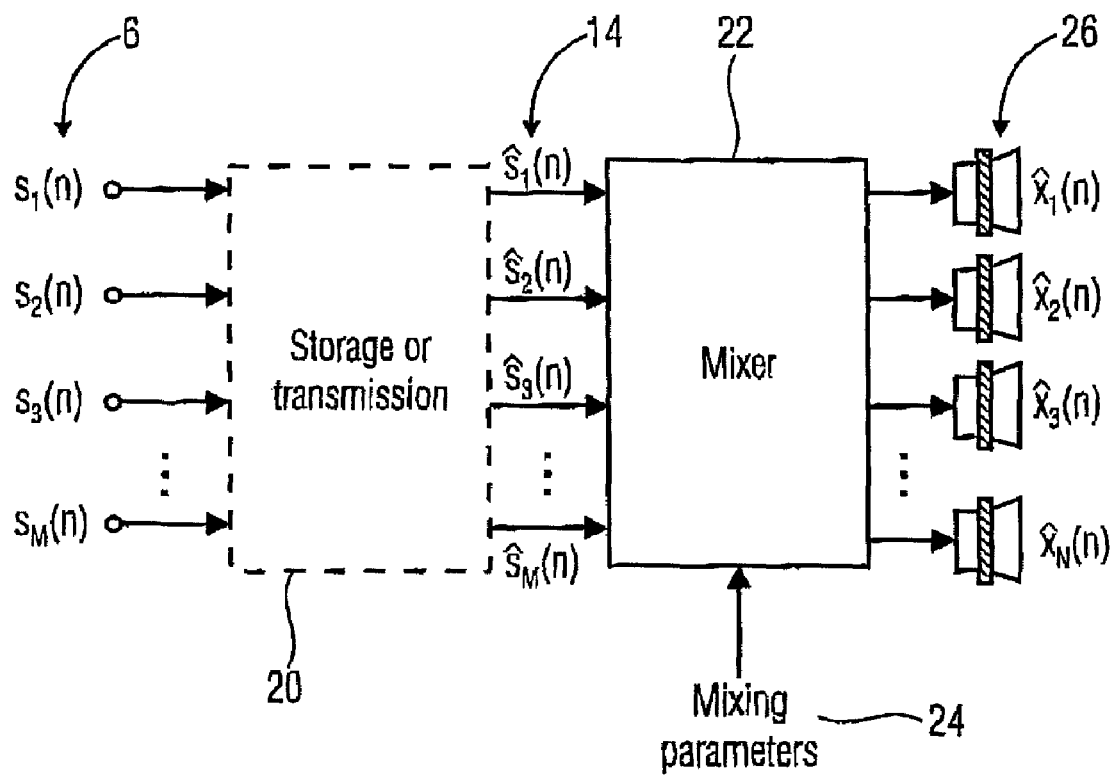
FIG. 2 shows an example of a JSC renderer.

FIG. 2 shows a further enhanced scheme of JSC coding, based on the scheme of FIG. 1. The features detailed with respect to FIG. 1 are enclosed with the storage or transmission box 20, receiving the input channels 6 to be encoded and outputting estimates 14 of the input channels 6. The scheme of FIG. 2 is enhanced in that it furthermore comprises a mixer 22 receiving the estimates. That is, the synthesized objects 14 are not output as single audio signals directly, but rendered to N output channels in the mixer module. Such a mixer can be implemented in different ways., for example receiving additional mixing parameters 24 as input, to steer the mixing of the synthesized objects 14. As an example only, one may consider a teleconferencing scenario, in which each of the output channels 26 is attributed to one participant of the conference. Therefore, a participant at the receiving end has the possibility to virtually separate the other participants by assigning their voices to individual positions. Thus, not only the voice may serve as criterion to distinguish between different participants of a telephone-conference, but also the direction from which a listener receives the voice of a participant. Furthermore, a listener may arrange the output channel such that all the participants from the same teleconferencing location are grouped in the same direction, enhancing the perceptual experience even more.

As shown in FIG. 2, $s_1(n) \ldots s_M(n)$ denote the discrete audio objects at the input of the JSC encoder. At the JSC decoder output $\hat{s}_1(n) \ldots \hat{s}_M(n)$ represent the 'virtually' separated audio objects that are fed into the mixer. Mixing parameters 24 can be interactively modified at the receiver side to place the different objects in a sound stage that is reproduced by the output channels $\hat{x}_1(n) \ldots \hat{x}_N(n)$.

Figure 3:
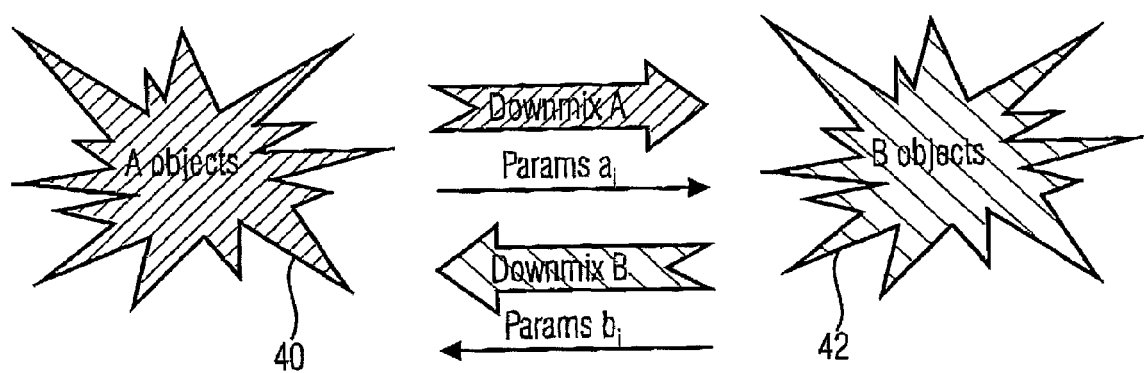
FIG. 3 shows a teleconferencing scenario with two locations.

FIG. 3 shows the application of multi-channel audio coding schemes to a basic teleconferencing scenario, taking place between two locations. Here, a first location 40 communicates with a second location 42. The first location may have A participants, i.e. A audio objects, the second location has B participants or audio objects. For point-to-point teleconferencing, the described technology of JSC coding can be applied straightforward to transmit audio signals of multiple objects at each location to the corresponding remote station. That is, (A-1) parameters $a_i$ and an associated down-mix are transferred to location 42. In the opposite direction, (B-1) parameters $b_1$ are transmitted together with an associated down-mix to location 40.

Figure 4:
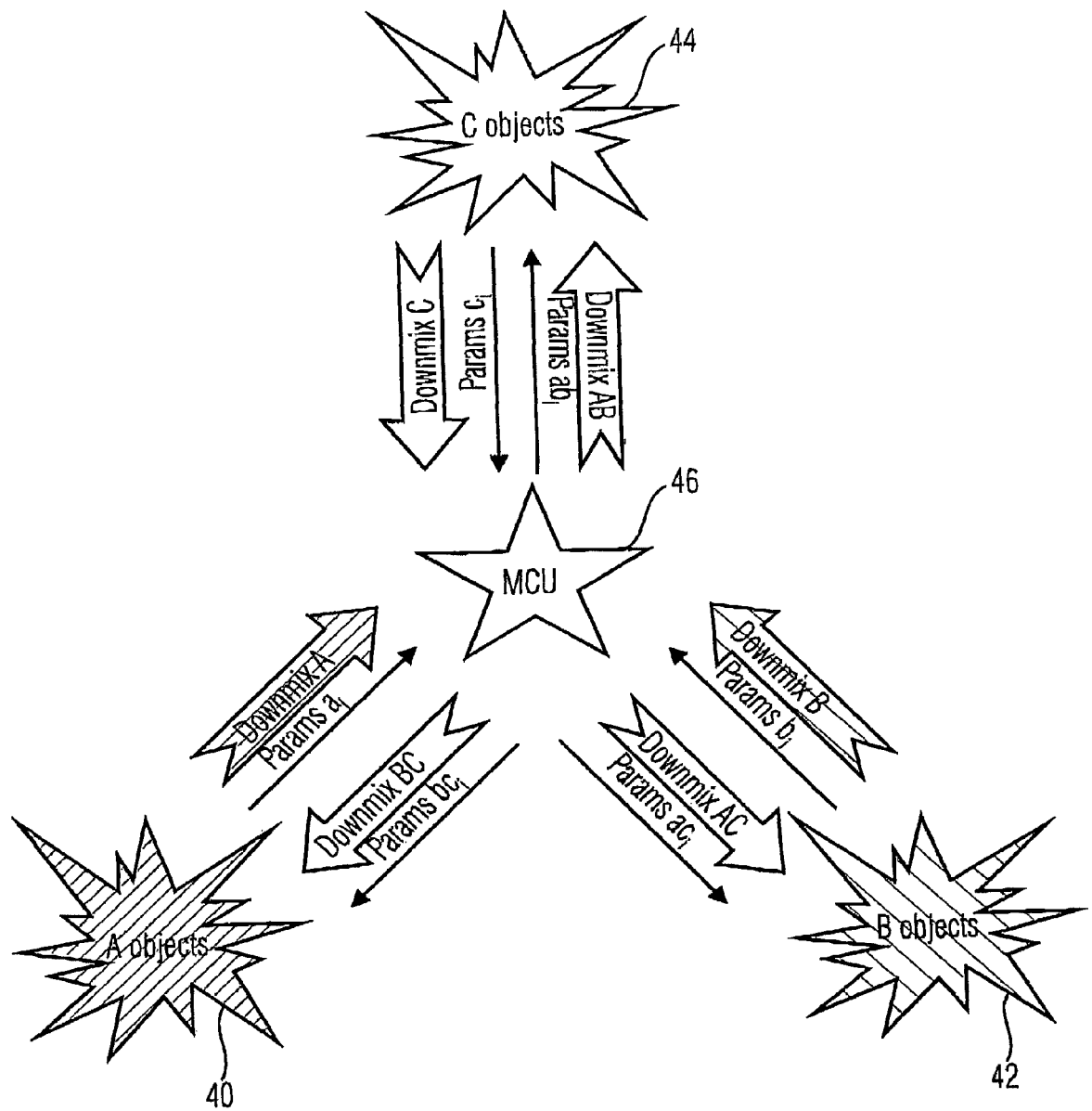
FIG. 4 shows a teleconferencing scenario with three locations.

For teleconferencing with more than two end points, the situation is completely different, as illustrated in FIG. 4.

FIG. 4 shows, apart from locations 40 and 42 a third location 44. As can be seen in FIG. 4, such a scenario needs a central distributor for the associated audio signals, generally called multi point control unit, MCU. Each of the locations (sites) 40, 42 and 44 is connected to the MCU 46. For each site 40, 42 and 44, there is a single upstream to the MCU containing the signal from the site. As each individual site needs to receive the signals from the remaining sites, the down-stream to each site 40, 42 and 44 is a mix of the signals of the other sites, excluding the site's own signal, which is also referred to as the (N-1) signal. Generally, to fulfill the requirements of the set-up and to keep the transmission bandwidth reasonably low, transmitting N-1 JSC coded streams from the MCU to each site is not feasible. This would, of course, be the straightforward option.

The state of the art approach to derive the individual down-streams is to resynthesize all incoming streams (objects) within the MCU 46 using a JSC decoder. Then, the resynthesized audio objects could be regrouped and re-encoded such as to provide every site with audio streams comprising the desired audio objects or audio channels. Even within this simple scenario, this would mean three decoding and three encoding tasks, which must be simultaneously performed within MCU 46. Despite the significant computational demands, audible artefacts can be additionally expected by this parametric "tandem coding" (repeated encoding/decoding) process. Increasing the number of sites would further increase the number of streams and hence the number of required encoding or decoding processes, making none of the straightforward approaches feasible for real-time scenarios.

According to the present invention, therefore, a scheme for mixing different parametrically encoded streams (JSC-streams in this particular example) directly within the down-mix and object parameter domain is developed for such a MCU type scenario, creating the desired output signals (output audio-streams) with a minimum of computational effort and quality loss.

Within the following paragraphs, the inventive concept of directly mixing multi-channel parametrically encoded audio-streams within the parameter domain is detailed for JSC-encoded audio-streams.

Figure 5:
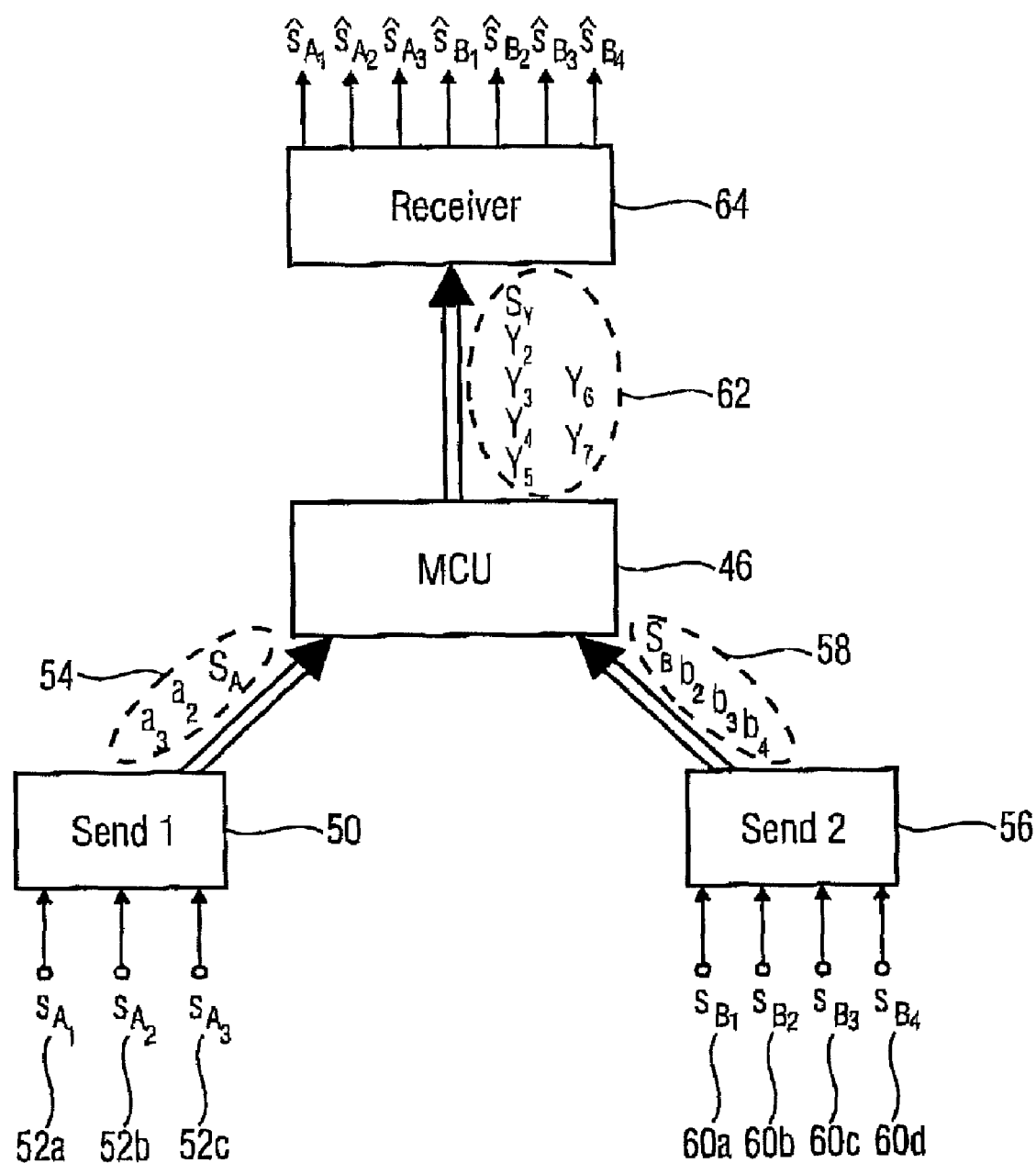
FIG. 5 shows an example of teleconferencing using an inventive audio signal generator.

The inventive concept is explained with the combination of two original audio signals (streams) into one output signal. Joining three or more streams together can easily be derived from the case of combining two streams. The following mathematical considerations are illustrated by FIG. 5, showing a case where three audio-channels of site A have to be combined with four audio-channels of site B. This is, of course, only an example to visualize the inventive concept.

When using JSC coding, site 50 (A) having three conference participants (speakers) 52a to 52c generating signals $s_{Ax}$, transmits an audio-stream or audio signal 54. Audio signal 54 has a down-mix channel $s_A$ and parameters $a_2$ and $a_3$, relating the power of channels 52b and 52c to the power of channel 52a. Equivalently, site 56 (B) transmits an audio signal 58 having a down-mix channel $s_B$ and three parameters $b_2$, $b_3$, and $b_4$, being the JSC-encoded representation of four speakers 60a to 60d. MCU 46 combines the audio signals 54 and 58 to derive an output signal 62 having a combined down-mix channel $s_Y$ and 6 parameters $y_2, \ldots, y_7$.

On the receiving side, the receiver 64 decodes output signal 62 to derive representations of the 7 audio objects or audio channels of sites 50 and 56.

In general terms, the goal is to form a single combined representation 62 of two JSC streams 54 and 58, each representing a number of objects by one common down-mix signal sy and one set of object parameters characterizing the objects. Ideally, the combined JSC representation shall be identical to the one that would be obtained by encoding the full set of original source signals underlying both JSC streams into a single JSC stream in one step.

To keep the following equations simple, we assume that the relative power ratios from Equation 1 are not available in the logarithmic domain, but just as power ratios. Each object parameter ri(n) of a certain object i can be derived as $$r_i(n) = \frac{E\{s_{r_i}^2(n)\}}{E\{s_{r_1}^2(n)\}} \qquad \text{Equation 3}$$

The transposition in the logarithmic domain can be applied afterwards to each parameter in order to allow for quantization using a logarithmic power scale.

All signals below are assumed to be decomposed into a subband representation, thus each of the calculations is applied for each subband separately.

We have stream A with its down-mix signal $s_A$ and parameters (relative power ratios) for U objects $a_2 \ldots a_U$. Stream B consists of the down-mix signal $s_B$ and parameters for V objects $b_2 \ldots b_V$.

The combined down-mix signal $s_Y$ can be formed as a linear combination of both down-mix signals $s_A$ and $s_B$. To ensure correct volume leveling of the different object contributions, gain factors $g_A$ and $g_B$ can be applied.

$$s_Y = g_A \cdot s_A + g_B \cdot s_B$$

with $$g_A = \frac{U}{(U+V)}, g_B = \frac{V}{(U+V)}$$

This kind of scaling can be meaningful if single sound sources of equal average power have been summed and normalized to the full scale of the down-mix path.

Alternatively one could use a power-preserving approach for the gain factors with $$g_A = \sqrt{\frac{U}{(U+V)}}, g_B = \sqrt{\frac{V}{(U+V)}}$$

Another possibility is to choose the gain factor such that both down-mix signals contribute the same average energy to the combined down-mix, i.e. by choosing $$\frac{g_B}{g_A} = \sqrt{\frac{E\{s_A^2(n)\}}{E\{s_B^2(n)\}}}.$$

The object parameters $y_i$ for the combined stream $s_Y$ shall represent all U+V objects.

Since the parameters associated to the down-mix channels are relative power ratios, the parameters $a_2, \ldots, a_U$ can be used as they are (unaltered) and the parameters for objects of B can be concatenated to parameters $a_2, \ldots, a_U$. Once the first object of signal A is chosen to be the reference object or reference channel, the original parameters $b_i$ have to be transformed to relate to that reference channel. It may be noted that only the parameters of one stream have to be recalculated, further decreasing the computational load within an MCU 46.

It may be further noted that it is by no means necessary to use the reference channel of one of the original audio-streams as new reference channel. The inventive concept of combining parametrically encoded audio-streams within the parameter-domain may very well also be implemented with other reference channels, chosen from the number of original channels of sites A or B. A further possibility would be to use the combined down-mix channel as new reference channel.

Following this approach of using the original reference channel of site A as new reference channel (combined reference channel), the energy (power) of the first object (channel) of each signal A and B has to be calculated first, since these are only implicitly available.

The power preservation for down-mix signal A, assuming statistically independent sources, gives:

$$E\{s_A^2(n)\} = \sum_{i=1}^{U} E\{\hat{s}_i^2(n)\}.$$

The signal powers $E\{s_{A_2}^2(n)\} \ldots E\{s_{A_U}^2(n)\}$ are defined with their relative powers $a_2 \ldots a_U$ to $E\{s_{A_1}^2(n)\}$:

$$E\{s_{A_2}^2(n)\} = a_2 \cdot E\{s_{A_1}^2(n)\}$$

$$E\{s_{A_3}^2(n)\} = a_3 \cdot E\{s_{A_1}^2(n)\}$$

$$E\{s_{A_U}^2(n)\} = a_U \cdot E\{s_{A_1}^2(n)\}$$

This leads to the power of $s_{A_1}$ as:

$$E\{s_{A_1}^2(n)\} = \frac{E\{s_A^2(n)\}}{(1 + a_2 + a_3 + \ldots + a_U)}$$

Applying the same for down mix signal $s_B$ we can calculate the power of object $S_{B_1}$ as:

$$E\{s_{B_1}^2(n)\} = \frac{E\{s_B^2(n)\}}{(1+b_2+b_3+\ldots+b_V)}$$

Now we can build the new parameter set for all objects of signal $s_Y$:

$y_1$: (not transmitted, reference object, implicitly available)

$$y_2 = a_2$$
$$y_3 = a_3$$
$$\ldots$$
$$y_U = a_U$$
$$y_{U+1} = \frac{g_B^2}{g_A^2} \cdot \frac{E\{s_{B_1}^2(n)\}}{E\{s_{A_1}^2(n)\}},$$

(power ratio of first object of signal B with respect to reference object A1)

$$y_{U+2} = b_2 \cdot \frac{g_B^2}{g_A^2} \cdot \frac{E\{s_{B_1}^2(n)\}}{E\{s_{A_1}^2(n)\}},$$

(power ratio of second object of signal B renormalized to the power of the reference object A1)

$$y_{U+3} = b_3 \cdot \frac{g_B^2}{g_A^2} \cdot \frac{E\{s_{B_1}^2(n)\}}{E\{s_{A_1}^2(n)\}}$$
$$\ldots$$
$$y_{U+V} = b_V \cdot \frac{g_B^2}{g_A^2} \cdot \frac{E\{s_{B_1}^2(n)\}}{E\{s_{A_1}^2(n)\}}$$

As the previous paragraphs have shown, the inventive concept allows for the generation of a combined audio-stream using only simple arithmetic operations, hence being computationally extremely efficient. Thus, the combination of multiple parametrically encoded audio-streams can be performed in real time.

Figure 6:
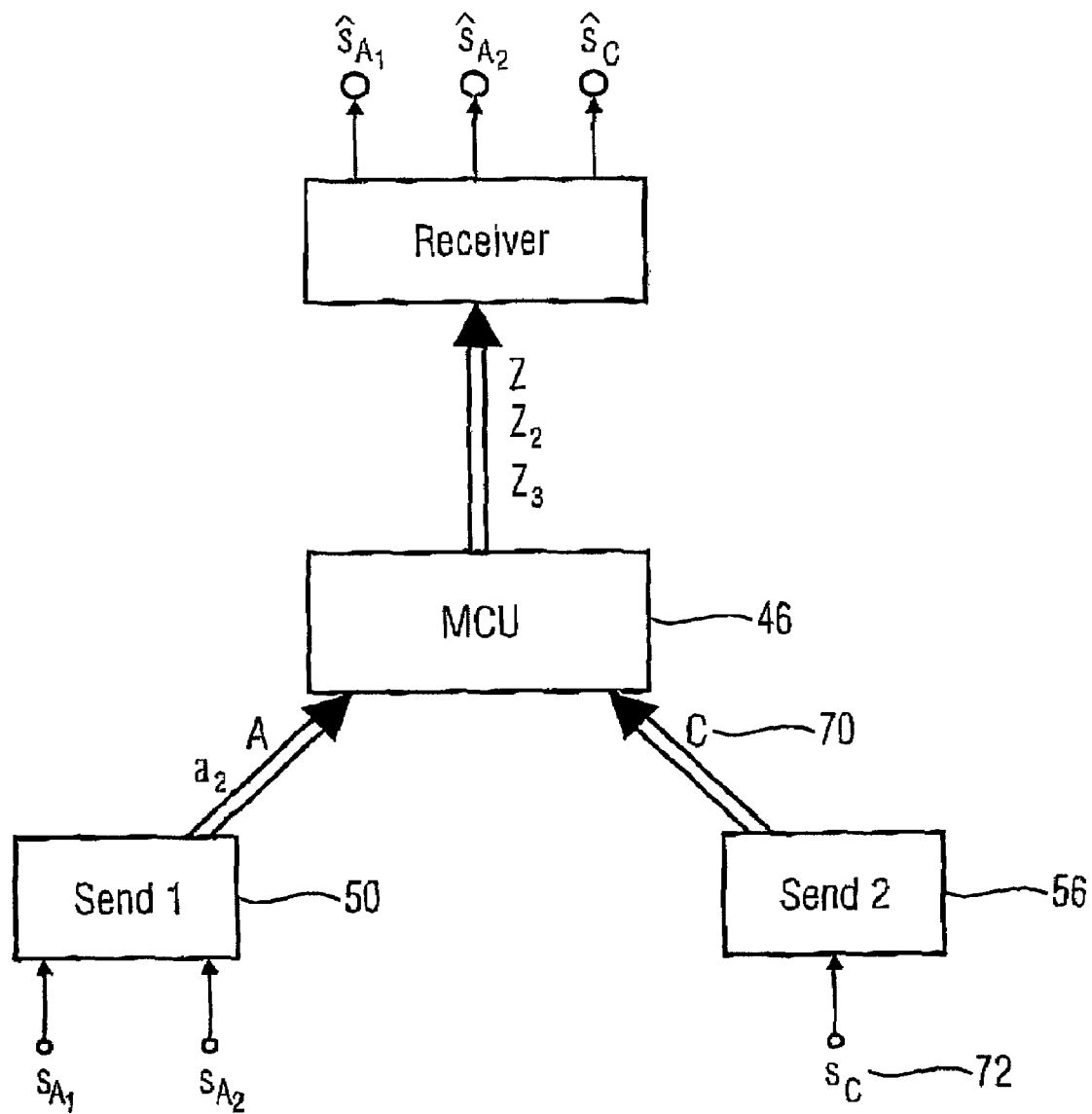
FIG. 6 shows a further example of teleconferencing using an inventive audio signal generator.

To further emphasize the great flexibility of the inventive concept, FIG. 6 shows how a monophonic signal 70, caused by a single speaker at site 56 can inventively be combined with two or more JSC-coded signals of speakers at site 50. That is, due to the flexibility of the inventive concept, monophonic signals of arbitrary teleconferencing systems can inventively be combined with parametrically coded multi-channel (multi-object) sources to generate a JSC-encoded audio signal representing all original audio channels (objects).

Extending compatibility also with remote stations that are not able to transmit JSC objects, but traditional monophonic signals, this technique is also applicable to insert a monophonic object e.g. from a legacy conferencing device into the object based stream.

The above example with the JSC stream A (down mix $s_A$, parameters $a_2 \ldots a_U$) and a monophonic object C (down mix sc) leads to a combined signal Z with the down-mix signal $$s_Z = g_A \cdot s_A + g_C \cdot s_C$$

with gain factors as discussed previously and its object parameters:

$y_1$: not transmitted (reference channel, implicitly available)

$$y_2 = a_2$$
$$y_3 = a_3$$
$$\ldots$$
$$y_U = a_U$$
$$y_{U+1} = \frac{g_C^2}{g_A^2} \cdot \frac{E\{s_C^2(n)\}}{E\{s_{A_1}^2(n)\}},$$

(power ratio of signal C with respect to reference object A1)

The aforementioned example of transcoding/merging two JSC streams depends on the representation of the power of the objects as given in Equation 1. Nonetheless, the same inventive scheme can be applied also to other ways of representing this information.

Figure 6B:
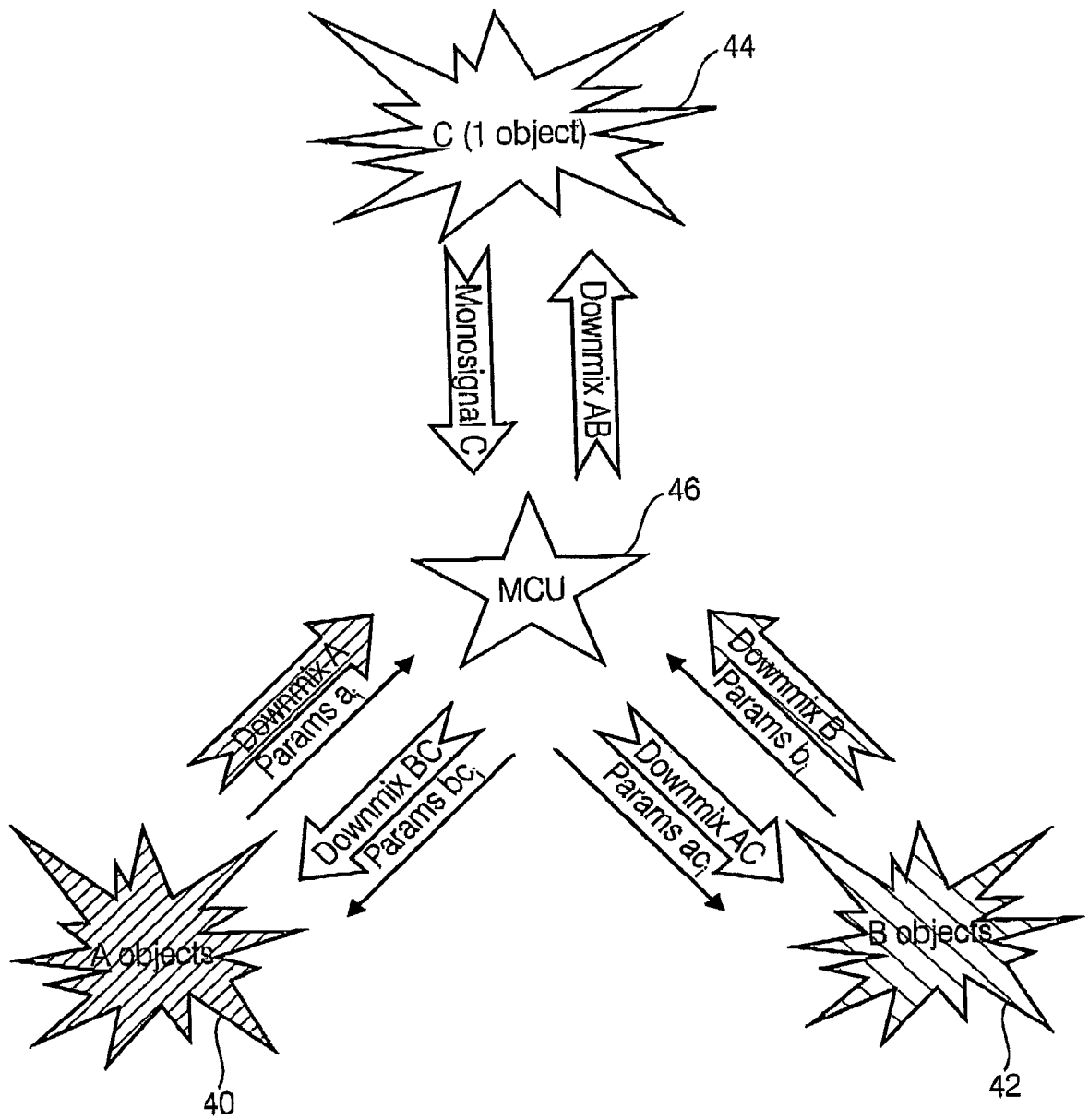
FIG. 6b shows the backwards compatibility of the inventive concept.

FIG. 6b again emphasizes the great flexibility of the inventive concept incorporating one monophonic audio source. FIG. 6b is based on the multi-channel scenario of FIG. 4 and furthermore shows how easily a prior art monophonic audio coder present at audio source C(44) can be integrated into a multi-channel audio conference using the inventive MCU 46.

As previously mentioned, the inventive concept is not restricted to JSC-coding having a predetermined fixed reference channel. Therefore, in an alternative example, the power ratio may be computed with respect to a reference channel, which is varying with time, the reference channel being the one channel having the most energy within a given predetermined time interval.

Instead of normalizing the band wise signal power values to the power of the corresponding band of a fixed reference channel (object) and transposing the result to the logarithmic (dB) domain as outlined by Equation 1, the normalization can take place relative to the maximum power over all objects in a certain frequency band:

$$pnorm_i(n) = \frac{E\{s_i^2(n)\}}{\max_i(E\{s_i^2(n)\})}, i = 1 \ldots M \qquad \text{Equation 4}$$

These normalized power values (which are given in a linear representation) do not need any further limitation to a certain upper border, since they innately can only take on values between 0 and 1. This advantage entails the drawback of having to transmit one additional parameter for the no longer a-priori known reference channel.

The mixing process for this scenario would include the following steps (that again have to be carried out for each subband separately):

We have stream A with its down mix signal $s_A$ and parameters (normalized power values, Equation 3, Equation 1) for U objects $a_1 \ldots a_U$.

Stream B consists of the down mix signal $s_B$ and parameters for V objects $b_1 \ldots b_V$.

A combined down mix signal can be formed according to one of the options already shown:

$$s_Y = g_A \cdot s_A + g_B \cdot s_B$$

All normalized power values for the combined representation $y_i$ have to be set in relation to the object with the highest power of all objects of signal Y. There are two candidates for being this 'maximum object' of Y, either the maximum object of A or the maximum object of B, both can be identified by having a normalized power ratio of '1'.

This decision can be made by comparing the absolute power of both candidates. Again we can use the relation to the power of the down mix signals (Equation 2) to get:

$$E\{s^2_{A_{max}}(n)\} = \frac{E\{s^2_A(n)\}}{\sum_{i=1}^{U} a_i} \text{ and } E\{s^2_{B_{max}}(n)\} = \frac{E\{s^2_B(n)\}}{\sum_{i=1}^{V} b_i}$$

Now we can compare the maximum object powers weighted with the gain factors of the down mix process:

$$g_A^2 \cdot E\{s_{A_{max}}^2(n)\} > g_B^2 \cdot E\{s_{B_{max}}^2(n)\}?$$

Whatever object's power is higher, this object will serve as 'maximum object' for the combined parameters $y_i$.

As an example, let $a_2$ be the overall maximum power object $a_{max}$ of both signals A and B, then all other parameters can be combined as:

$$y_1 = a_1$$
$$y_2 = a_2$$
$$\ldots$$
$$y_U = a_U$$
$$y_{U+1} = b_1 \frac{g_B^2}{g_A^2} \cdot \frac{E\{s^2_{B_{max}}(n)\}}{E\{s^2_{A_{max}}(n)\}},$$

(power ratio of first object of signal B with respect to 'maximum object', here $a_2$)

$$y_{U+2} = b_2 \cdot \frac{g_B^2}{g_A^2} \cdot \frac{E\{s^2_{B_{max}}(n)\}}{E\{s^2_{A_{max}}(n)\}}$$
$$\ldots$$
$$y_{U+V} = b_V \cdot \frac{g_B^2}{g_A^2} \cdot \frac{E\{s^2_{B_{max}}(n)\}}{E\{s^2_{A_{max}}(n)\}}$$

For this example, all parameters for the objects of A can remain unchanged, since signal A carried the overall maximum object.

Also in this representation, the insertion of a monophonic object can be done accordingly, e.g. by assuming V=1.

Generally, the transcoding process is carried out such that its result approaches the result that would have been achieved if all original objects for both streams had been encoded into a single JSC stream in the first place.

Figure 7:
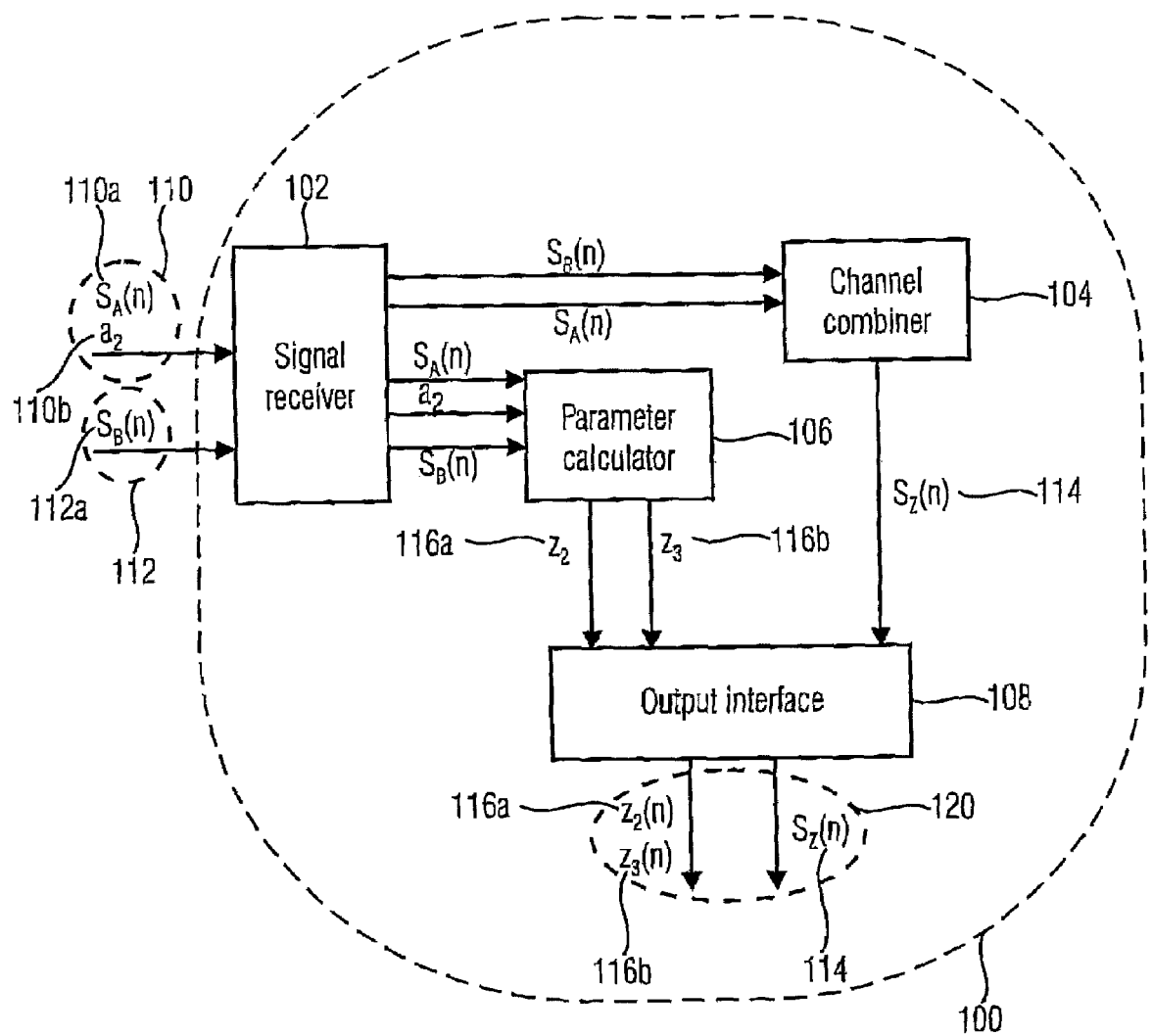
FIG. 7 shows an example for an inventive audio signal generator.

FIG. 7 shows an example for an inventive audio signal generator for generating an audio output signal, as it may be used within MCU 46 to implement the inventive concept.

The audio signal generator 100 comprises an audio signal receiver 102, a channel combiner 104, a parameter calculator 106, and an output interface 108.

The audio signal receiver 102 receives a first audio signal 110 comprising a first down-mix channel 110a having information on two or more first original channels and comprising an original parameter 110b associated to one of the original first channels describing a property of one of the original first channels with respect to a reference channel. The audio signal receiver 102 further receives a second audio signal 112 comprising a second down-mix channel 112a having information on at least one second original channel.

The audio signal receiver outputs the first down-mix channel 110a and the second down-mix channel 112a to an input of the channel combiner 104 and the first down-mix channel 110a, the second down-mix channel 112a, and the original parameter 110b to the parameter calculator 106.

The channel combiner 104 derives a combined down-mix channel 114 by combining the first down-mix channel 110a and a second down-mix channel 112b, i.e. by combining the down-mix channels directly without reconstructing the underlying original audio channels.

The parameter calculator 106 derives a first combined parameter 116a describing the property of one of the first original channels with respect to a common reference channel and a second combined parameter 116b describing the property of another one of the first original channels or of the at least one second original channel with respect to the same common reference channel. The first and second combined parameters are input into the output interface 108, which further receives the combined down-mix channel 114 from the channel combiner 104. Finally, the output interface outputs an output signal 120 comprising the combined down-mix channel 114 and the first and second combined parameters 116a and 116b.

The audio output signal has thus been derived without full reconstruction of the input audio signals and hence without computationally expensive operations.

Within the above paragraphs, the general concept of mixing two or more signals, each being based on a JSC parametric approach has been shown. Particularly, the above equations show how to apply this technique for a case, where the parametric information consists of relative power ratios. Nonetheless, this technique is not restricted to a specific representation of object parameters. Therefore, also parameters describing amplitude measures or other properties of individual audio channels, such as correlations, may be used. The power ratios may also be computed with respect to the combined down-mix channel, at the cost of transmitting one additional parameter. On the other hand, one benefits in this alternative scenario from reduced computational complexity during mixing of audio-streams, since the reconstruction of the power of the reference channel, which is not explicitly transmitted in "generic" JSC, is obsolete.

Furthermore, the invention is not limited to a teleconferencing scenario but can be applied wherever multiplexing of parametric objects into a single stream is desired. This may for example be the case within BCC-coding schemes, MPEG spatial surround and others.

As has been shown, the inventive concept even allows to seamlessly include legacy remote stations providing a single monophonic signal into the object-based scenario. Apart from the combining of different object streams, the inventive concept also shows how different ways of representing parametric data can be generated such that they are suitable for enabling computationally efficient combination processes. As such, it is an advantageous characteristic of an inventive parametric bit stream syntax to express the object properties in such a way that two streams can be combined by performing merely simple operations.

Therefore, the inventive concept also teaches how to create appropriate bit streams or bit stream formats to parametrically encode multiple original audio channels (audio objects), by adhering to the following criteria:

- The combined down-mix signal is formed simply from the partial down-mix signals
- The combined parametric side information is formed from combining individual parametric side information and some simple to compute features of the down-mix signals (e.g. energy)
- In no case, a complex operation such as a decoding/re-encoding step for the audio objects has to be performed.

Therefore, the parametric representation describing the objects has to be chosen such that a combination ("addition") of two or more object streams is possible using only bit stream fields that are available as part of the parametric side information, and possibly simple to compute metrics of the down-mix signals (e.g. energy, peak value).

An example for such a representation could be using normalized power values (Equation 4) for each object. These might be transformed into a logarithmic representation (dB) and then quantized to a certain number of quantizer steps or their representative quantizer indices. The bit stream syntax should allow for easily increasing (or decreasing) the number of object parameters in a stream, e.g. by simply concatenating, inserting or removing parameters.

Summarizing, the inventive concept allows for a most flexible and computationally efficient combination of parametrically encoded audio-streams. Due to the high computational efficiency, the inventive concept is not restricted to a maximum number of channels to be combined. Principally, the channels, which can be combined in real time, may be provided to an inventive audio signal generator in arbitrary numbers. Also, the precise parametric representation (JSC) used to illustrate the inventive concept is not mandatory. Furthermore, as already mentioned, other parametric coding schemes, such as the commonly known surround schemes, may be the basis for the application and inventive concept.

Furthermore, the computations necessary do not necessarily have to be applied in software. Hardware implementations using for example DSPs, ASICs, and other integrated circuits may also be used to perform the calculations, which will even more increase the speed of the inventive concept, allowing for the application of the inventive concept in real time scenarios.

Because of the flexibility of the inventive concept, inventive audio-streams may be based on different parametric representations. The parameters to be transmitted could for example also be amplitude measures, time differences between original audio channels, coherence measures, and others.

Thus, the general concept of mixing two or more signals that are each based on a JSC-style parametric approach has been shown.

The above equations show how to apply this technique for a case, where the parametric information consists of relative power ratios. Nonetheless this technique is not restricted to a specific representation of object parameters.

Furthermore the invention is not limited to a teleconferencing scenario but can be applied in any case, where multiplexing parametric objects into a single JSC-stream is advantageous.

In addition this technique allows to seamlessly include legacy remote stations providing a single monophonic signal into the object based scenario.

Apart from the actual process of combining different object streams, the invention also shows how different ways of representing parametric data are suitable for enabling this combination process. Since not all possible parametric representations permit such a described combination process without full decoding/re-encoding of the objects, it is an advantageous characteristic of a parametric bit stream syntax to express the object properties in a way that two streams can be combined by performing merely simple operations.

Depending on certain implementation requirements of the inventive methods, the inventive methods can be implemented in hardware or in software. The implementation can be performed using a digital storage medium, in particular a disk, DVD or a CD having electronically readable control signals stored thereon, which cooperate with a programmable computer system such that the inventive methods are performed. Generally, the present invention is, therefore, a computer program product with a program code stored on a machine-readable carrier, the program code being operative for performing the inventive methods when the computer program product runs on a computer. In other words, the inventive methods are, therefore, a computer program having a program code for performing at least one of the inventive methods when the computer program runs on a computer.

While the foregoing has been particularly shown and described with reference to particular embodiments thereof, it will be understood by those skilled in the art that various other changes in the form and details may be made without departing from the spirit and scope thereof. It is to be understood that various changes may be made in adapting to different embodiments without departing from the broader concepts disclosed herein and comprehended by the claims that follow.

The invention claimed is:

1. Audio signal generator for generating an audio output signal, comprising:
    an audio signal receiver for receiving:
        a first audio signal comprising a first down-mix channel having information on two or more first original channels, and comprising an original parameter associated with one of the first original channels describing a property of one of the first original channels with respect to a reference channel; and
        a second audio signal comprising a second down-mix channel having information on at least one second original channel;
    a channel combiner for deriving a combined down-mix channel by combining the first down-mix channel and the second down-mix channel;
    a parameter calculator for deriving a first combined parameter describing the property of one of the first original channels with respect to a common reference channel, and a second combined parameter describing the property of another one of the first original channels or of the at least one second original channel with respect to the common reference channel; and
    an output interface for outputting the audio output signal comprising the combined down-mix channel, the first and second combined parameters.

2. Audio signal generator in accordance with claim 1, in which the channel combiner is operative to derive the combined down-mix channel using a linear combination of the first and the second down-mix channel.

3. Audio signal generator in accordance with claim 2, in which the channel combiner is operative to use a linear combination having coefficients depending on the energy $E(sA2(n))$ within the first down-mix channel and on the energy $E(sB2(n))$ within the second down-mix channel.

4. Audio signal generator in accordance with claim 3, in which the channel combiner is operative to use a linear combination having a coefficient gA for the first down-mix channel, and a coefficient gB for the second down-mix channel derived using the following equation:

$$\frac{g_B}{g_A} \sqrt{\frac{E\{s_A^2(n)\}}{E\{s_B^2(n)\}}}.$$

5. Audio signal generator in accordance with claim 2, in which the channel combiner is operative to use a linear combination having coefficients depending on the number U of the first original channels and the number V of the second original channels.

6. Audio signal generator in accordance with claim 5, in which the channel combiner is operative to use a linear combination having a coefficient gA of the first down-mix channel and a coefficient gB of the second down-mix channel derived according to one of the following equations:

$$g_A = \frac{U}{(U+V)}, \quad g_B = \frac{V}{(U+V)}$$

or $$g_A = \sqrt{\frac{U}{(U+V)}}, \quad g_B = \sqrt{\frac{V}{(U+V)}}.$$

7. Audio signal generator in accordance with claim 1, in which the parameter calculator is operative to use a predetermined channel of the first original channels or the at least one second original channel as common reference channel.

8. Audio signal generator in accordance with claim 1, in which the parameter calculator is operative to use the reference channel of the first audio signal as the common reference channel.

9. Audio signal generator in accordance with claim 1, in which the parameter calculator is operative to use the combined down-mix channel as the common reference channel.

10. Audio signal generator in accordance with claim 1, in which the parameter calculator is operative to use the original channel as the common reference channel which has the highest energy.

11. Audio signal generator in accordance with claim 1, in which the parameter calculator is operative to calculate the energy $E\{sAref\}$ of the reference channel by deriving the energy $E\{sA2\}$ of the first down-mix channel and parameters $ai\{i=1, \ldots, n\}$ associated to channels other than the reference channel according to the equation:

$$E\{s_{A_{ref}}\} = \frac{E\{s_A^2(n)\}}{1 + \sum_i a_i}.$$

12. Audio signal generator in accordance with claim 1, in which the parameter calculator is operative to use the reference channel as the common reference channel and the original parameter a2 as first combined parameter yu and to derive the second combined parameter yu+1 for the at least one second original channel with respect to the reference channel.

13. Audio signal generator in accordance with claim 1, in which the parameter calculator is operative to derive the combined parameters using the energy $E\{sA2(n)\}$ of the first down-mix channel and the energy $E\{sB2(n)\}$ of the second down-mix channel.

14. Audio signal generator in accordance with claim 13, in which the parameter calculator is operative to further use coefficients gA associated to the first down-mix channel and gB associated to the second down-mix channel, the coefficients used for the linear combination of the first and second down-mix used by the channel combiner.

15. Audio signal generator in accordance with claim 14, in which the parameter calculator is operative to calculate the second combined parameter yU+1 for the at least one second original channel according to the following equation:

$$y_{U+1} = \frac{g_B^2}{g_A^2} \cdot \frac{E\{s_{B_1}^2(n)\}}{E\{s_{A_1}^2(n)\}},$$

wherein $E\{s_{A_1}^2(n)\}$ is the energy of the reference channel derived using the energy of the first down-mix channel $E\{s_A^2(n)\}$ according to the following formula:

$$E\{s_{A_1}^2(n)\} = \frac{E\{s_A^2(n)\}}{(1+a_2)},$$

wherein a2 is the original parameter relating a first original channel to the reference channel.

16. Audio signal generator in accordance with claim 1, in which the parameter calculator is operative to process frequency-portions of the first and the second down-mix channels associated with discrete frequency intervals such that combined parameters are derived for each discrete frequency interval.

17. Audio signal generator in accordance with claim 1, in which the audio signal receiver is operative to receive audio signals comprising down-mix channels represented by sampling parameters sampled with a predetermined sample frequency.

18. Method of generating an audio output signal, the method comprising:

receiving a first audio signal comprising a first down-mix channel having information on two or more first original channels, and comprising an original parameter associated with one of the first original channels describing a property of one of the first original channels with respect to a reference channel and a second audio signal comprising a second down-mix channel having information on at least one second original channel;

deriving a combined down-mix channel by combining the first down-mix channel and the second down-mix channel;

deriving a first combined parameter describing the property of one of the first original channels with respect to a common reference channel and a second combined parameter describing the property of another one of the first original channels or of the at least one second original channel with respect to a common reference channel; and outputting the audio output signal comprising the combined down-mix channel and the first and second combined parameters.

19. Conferencing System having an audio signal generator for generating an audio output signal, comprising:
   an audio signal receiver for receiving:
      a first audio signal comprising a first down-mix channel having information on two or more first original channels, and comprising an original parameter associated with one of the first original channels describing a property of one of the first original channels with respect to a reference channel; and
      a second audio signal comprising a second down-mix channel having information on at least one second original channel;
   a channel combiner for deriving a combined down-mix channel by combining the first down-mix channel and the second down-mix channel;
   a parameter calculator for deriving a first combined parameter describing the property of one of the first original channels with respect to a common reference channel, and a second combined parameter describing the property of another one of the first original channels or of the at least one second original channel with respect to the common reference channel; and
   an output interface for outputting the audio output signal comprising the combined down-mix channel, the first and second combined parameter.

20. A non-transitory storage medium having stored thereon a computer program for, when running on a computer, implementing a method for generating an audio output signal, the method comprising:
   receiving a first audio signal comprising a first down-mix channel having information on two or more first original channels, and comprising an original parameter associated with one of the first original channels describing a property of one of the first original channels with respect to a reference channel and a second audio signal comprising a second down-mix channel having information on at least one second original channel;
   deriving a combined down-mix channel by combining the first down-mix channel and the second down-mix channel;
   deriving a first combined parameter describing the property of one of the first original channels with respect to a common reference channel and a second combined parameter describing the property of another one of the first original channels or of the at least one second original channel with respect to a common reference channel; and
   outputting the audio output signal comprising the combined down-mix channel and the first and second combined parameters.

* * * * *